United States Patent
Simonsen et al.

(10) Patent No.: US 6,332,902 B1
(45) Date of Patent: Dec. 25, 2001

(54) FILTER UNIT HAVING A FILTER CLEANING NOZZLE ASSOCIATED WITH THE FILTER UNIT AND INCLUDING A GUIDE BODY

(75) Inventors: Per Simonsen, Jyllinge; Ove Emil Hansen, Allerød, both of (DK)

(73) Assignee: Niro A/S, Soborg (DK)

( * ) Notice: Subject to any disclaimer, the term of this patent is extended or adjusted under 35 U.S.C. 154(b) by 0 days.

(21) Appl. No.: 09/503,190

(22) Filed: Feb. 14, 2000

Related U.S. Application Data (63) Continuation of application No. PCT/DK00/00044, filed on Feb. 2, 2000.

(51) Int. Cl.⁷ .................................................. B01D 29/68
(52) U.S. Cl. .................................................. 55/302
(58) Field of Search ................................ 55/302; 96/233

(56) References Cited

U.S. PATENT DOCUMENTS

| | | |
|---|---|---|
| 2,804,168 | 8/1957 | Church . |
| 3,387,712 * | 6/1968 | Schrink .................................. 55/302 |
| 3,509,698 * | 5/1970 | Medcalf et al. ....................... 55/302 |
| 3,729,903 | 5/1973 | Espeel et al. . |
| 3,874,857 * | 4/1975 | Hunt et al. ............................. 55/302 |
| 4,356,010 | 10/1982 | Meyer zu Reimsloh . |
| 6,129,852 | 10/2000 | Eliott et al. . |
| 6,149,716 * | 11/2000 | Bach et al. ............................ 95/280 |

FOREIGN PATENT DOCUMENTS

| | | |
|---|---|---|
| 43 08 286 C2 | 1/1998 | (DE) . |
| 197 01 983 C1 | 6/1998 | (DE) . |
| 19701983 C1 | 6/1998 | (DE) . |
| 812244 | 4/1959 | (GB) . |
| 1021560 | 3/1966 | (GB) . |
| 1455281 | 11/1976 | (GB) . |
| PCT WO 9603195 A1 | 2/1996 | (WO) . |
| 99/55442 | 11/1999 | (WO) . |

\* cited by examiner

*Primary Examiner*—Robert A. Hopkins
(74) *Attorney, Agent, or Firm*—Sughrue Mion, PLLC (57) ABSTRACT

A filter unit for filtering gas has at least one filter element with an outlet opening. A filter cleaning nozzle is located in a clean-gas chamber at a distance from the outlet opening and is connected to a source of pressurized primary cleaning gas via a control valve. Primary cleaning gas is ejected from an annular slot and along the outer side of a guide body located in the clean-gas chamber. The guide body is open to the secondary gas in the chamber.

24 Claims, 6 Drawing Sheets

FILTER UNIT HAVING A FILTER CLEANING NOZZLE ASSOCIATED WITH THE FILTER UNIT AND INCLUDING A GUIDE BODY

CROSS-REFERENCE TO RELATED APPLICATIONS

The present application claims the benefit and is a continuation of the international patent application No. PCT/DK00/00044 filed on Feb. 2, 2000.

BACKGROUND OF THE INVENTION

The present invention relates to a filter unit for filtering gas, comprising at least one filter element having an outlet opening facing a clean-gas chamber, a filter cleaning nozzle, and a source of pressurized primary cleaning gas.

A filter unit of this type is known from DE patent 197 01 983 describing a nozzle of the slit ring jet type where the nozzle opening is an annular slot, which faces radially inwards towards the center of a flow pipe which passes centrally through a pressurized gas chamber and ends above the filter outlet opening. The control valve is pneumatically activated and built into the nozzle at the annular slot. The primary cleaning gas flows from the gas chamber through the annular slot and down along the inside of the flow pipe which acts as guide surface. The secondary gas is drawn into the flow pipe through its upper opening. The cleaning gas passes through a venturi mounted in the upper end area of the filter member.

A somewhat similar nozzle is described in U.S. Pat. No. 4,356,010 and in GB patent 1 455 281, but in the latter document the ring slit jet nozzle is mounted like a venturi in the top end of the filter element. The secondary gas is drawn centrally down through the upper end opening of the nozzle. GB patent 812,244 describes a simple nozzle shooting primary gas down through a venturi so that secondary gas is drawn down through the upper end opening of the venturi. GB patent 1,021,560 describes a nozzle pipe which is mounted in the bottom wall of a pressurized gas chamber and is closed at its upper end by a diaphragm valve. When the diaphragm valve is opened primary cleaning gas flows through the nozzle pipe and centrally down through a venturi at the upper end of the filter element. U.S. Pat. No. 3,729,903 describes a ring jet filter with an annular membrane valve mounted in the upper end of the filter element. A central pipe connects the filter element with the clean-air chamber. When the membrane valve is open secondary air is also drawn down through the upper end opening of the central pipe.

A feature common to all the prior art filter units mentioned above is that the secondary air is drawn in through the upper end opening of a pipe located centrally of the filter element.

BRIEF SUMMARY OF THE INVENTION

It is a purpose of the present invention to provide a very efficient filter cleaning nozzle of a simple design.

According to the present invention the filter cleaning nozzle is located in the clean-gas chamber at a distance from said outlet opening and is connected to the source of pressurized primary cleaning gas via a control valve; a guide body is located in the clean-gas chamber and has an outer surface; said nozzle has a nozzle opening for injection of primary cleaning gas onto a guide surface on the outer surface of the guide body; and the guide surface is open to secondary gas in the clean-gas chamber and directs said primary cleaning gas and entrained secondary gas towards the outlet opening of the filter.

When a burst of primary cleaning gas is shot out through the nozzle opening it flows along the outer side of the guide body and is in full and unrestricted contact with the secondary air in the clean-gas chamber. Compared to the prior art nozzles where the secondary gas has to be drawn in through the upper end opening of the nozzle, more secondary cleaning gas is entrained by the primary gas flowing on the outwards facing guide surface. As secondary gas is entrained the thickness of the air stream builds up and the diameter of the air stream increases. The larger diameter of the air stream facilitates further entrainment of secondary gas. In addition, there is no hindrance to the building up of a thicker air stream because it builds up outwards into the free air in the clean-gas chamber. These combined effects result in a nozzle design where the entrainment of secondary gas becomes more efficient the longer the air stream flows along the guide surface, and not less efficient as is the case when the guide surface is on the inside of a pipe and the air stream thickness builds up towards the center of the pipe.

In one embodiment the nozzle opening is an annular slot which is delimited by an annular rim of a feeding pipe for primary cleaning gas and the guide body positioned in front of the feeding pipe. This makes it possible to manufacture the guide body independently of the feeding pipe, because it simply needs to be mounted at a distance from the end of the feeding pipe corresponding to the desired width of the annular slot. The embodiment is furthermore suitable for retrofit mounting on existing filter units having feeding pipes.

In order to promote the gradual building up of the thickness of the air stream, the guide body portion facing towards the feeding pipe is preferably curved with its central area positioned closest to the feeding pipe. The curvature can vary along the guide body but for reasons of manufacturing simplicity the shape is preferably hemispherical. It is also possible to use a facetted shape or a shape composed of one or more conical portions.

In a preferred embodiment the guide body is integrated with the other part that delimits the nozzle opening. On the side facing away from the outlet opening of the filter the guide body extends into a housing, and an annular distribution chamber for primary cleaning gas in the housing ends at the nozzle opening, which is an annular slot delimited by an annular rim of the housing and the guide body. The two parts can then be manufactured as a unit having a very well defined and precise width of the annular slot, and the mounting work in the filter unit is facilitated. It is possible to make the annular chamber with a taper towards the annular slot, and preferably the included angle between an inner side wall of the distribution chamber and the outer side of the guide body is in the range of 2–45°. Due to the taper the chamber has a relatively large width in the end remote from the slot, which promotes efficient and even distribution of primary gas throughout the whole chamber, even when there is only one or a few inlet ports for primary gas to the chamber. At the opposite end of the chamber the width of the chamber approximately corresponds to the width of the slot, and this promotes more uniform gas flow conditions through the slot during the very short interval when primary air is shot out of the nozzle. If the included angle is less than 2° only an negligent effect is obtained, and angles larger than 45° will not result in any improvement of the distribution of the gas.

Preferably, the guide body is carried by the housing so that use of additional securing means is avoided, and even more preferably the guide body is permanently fixed to the housing, such as by welding the parts together. This reduces the risks of unintentionally loosening of a guide body during a filtration process or during inspection of the filter unit.

The efficiency of the nozzle in terms of capability for entrainment of secondary air is enhanced in an embodiment where the guide body from the nozzle opening has a first portion with increasing diameter in direction towards the outlet opening of the filter element. The increasing diameter allows on the one hand that the annular slot has an advantageously short length and thus a suitably large width for a certain nozzle opening area, and on the other hand that the flow of primary gas is spread out to have a larger diameter and consequently a large area in contact with the secondary gas.

In the most preferred embodiment the guide body has an end portion with decreasing diameter in direction towards the outlet opening of the filter element. The decreasing diameter reduces the contact area between the guide body and the gas flow in a gradual manner so that only small disturbances from eddy currents occur at the trailing end of the guide body.

In a further development the guide body is designed so that in between the first portion and the end portion the guide body has a second portion with substantially constant diameter. The second portion decreases the relative length of the first portion in relation to the overall length of the guide body so that the gas flow quickly obtains a large diameter by flowing across the short first portion and then gradually increases its outer diameter by added secondary gas during the flow along the second portion.

It is possible to provide the guide body with a longitudinal, through-going bore for feeding a part of the primary cleaning gas to the trailing end of the guide body. This can e.g. be an advantage when the filter element has a long length and/or a relatively small diameter because the longitudinal bore will eject part of the primary gas as a central jet having a larger velocity than the surrounding common flow of mixed primary and secondary gas. When the cleaning gas pulse hits the outlet opening of the filter element it has a larger velocity along the center line of the element and it consequently penetrates to the bottom of even very long filter elements. The longitudinal bore can also be utilized to further reduce the formation of wake disturbances at the trailing end.

The filter unit typically comprises a plurality of filter elements. Each of the filter elements has an associated filter cleaning nozzle which is connected to the source of pressurized primary cleaning gas via a feeding pipe that extends out of the clean-gas chamber to the control valve. By placing the control valve outside of the clean-gas chamber, only the feeding pipes with the nozzles are present in the clean-gas chamber, but not valves, supply pipes, gas sources etc. Due to the above mentioned design of the nozzle there are no internal surfaces in the nozzle where debris can accumulate. All the interior surfaces are swept clean by each burst of primary gas, and also the outside of the guide body is swept clean. The advantage of this is that the clean-gas chamber can easily be kept at sanitary conditions, which is hardly or not possible in the prior art designs. This advantage can be further improved by mounting the feeding pipes in mainly vertical positions.

The nozzle design provides such an effective burst of cleaning gas that the previously used venturi at the upper end of the filter element can be completely left out so that the filter element material in vicinity of the outlet opening is freely open to cleaning air from the nozzle. This provides the distinct advantage that the cleaning gas acts over the complete length of the filter element, viz. also near the outlet opening where filter material in the provious designs was in shelter behind the venturi wall.

BRIEF DESCRIPTION OF THE SEVERAL VIEWS OF THE DRAWING

Examples of the invention will now be explained below with reference to the very schematical drawings, in which.

DETAILED DESCRIPTION OF THE INVENTION

Figure 1:
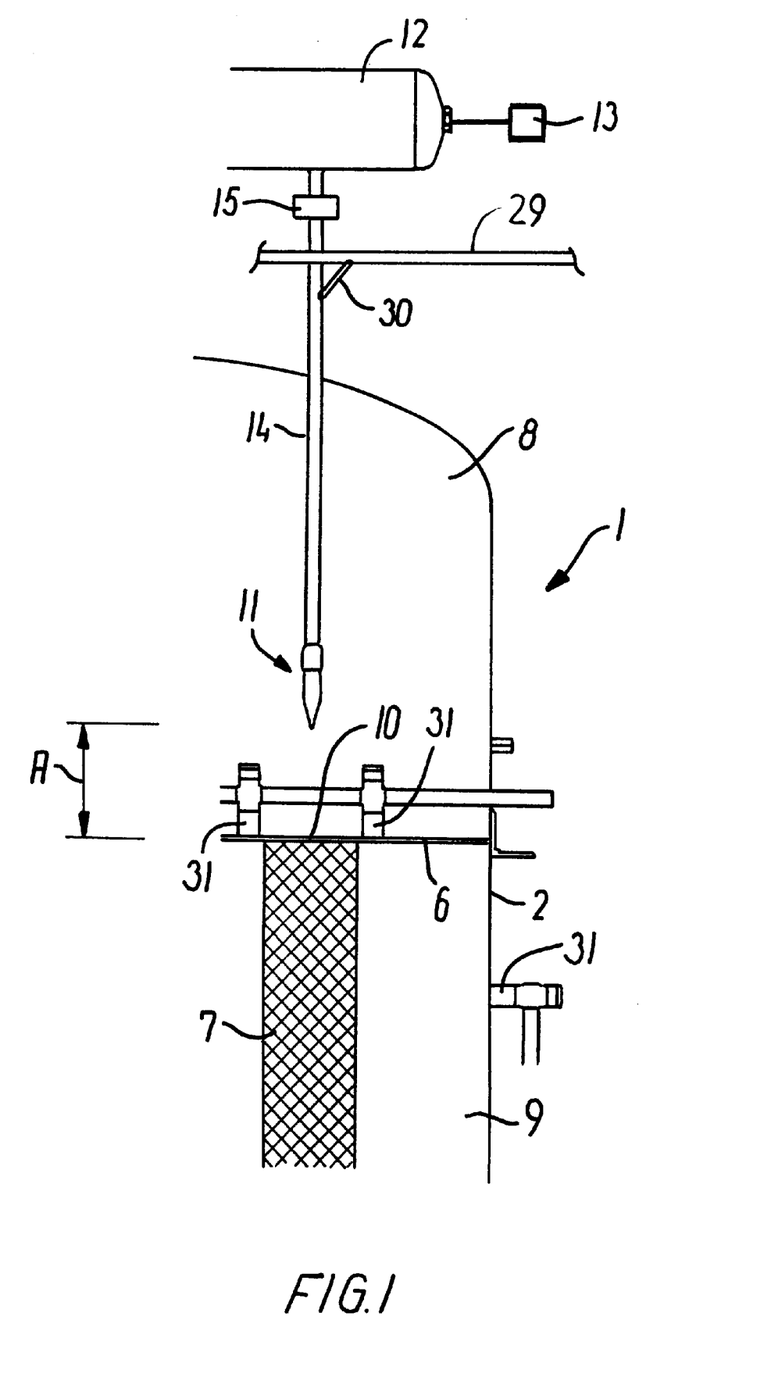
FIG. 1 depicts a part-sectional view of a filter unit according to the invention.

FIG. 1 illustrates a filter unit 1 according to the invention, which is employed for separating product particles from a process gas coming e.g. from a spray drying apparatus, a fluid bed apparatus, a drying apparatus, an agglomeration apparatus or the like using air or gas in the treatment of particulate or dustlike products, or from other industrial processes, such as flue gas cleaning. The products can be e.g. foodstuffs, dairies, pharmaceuticals, dyestuffs, chemical products etc. The process gas can be e.g. heated air or drying gas or special gas compositions inert to the products treated in the apparatus.

Figure 9:
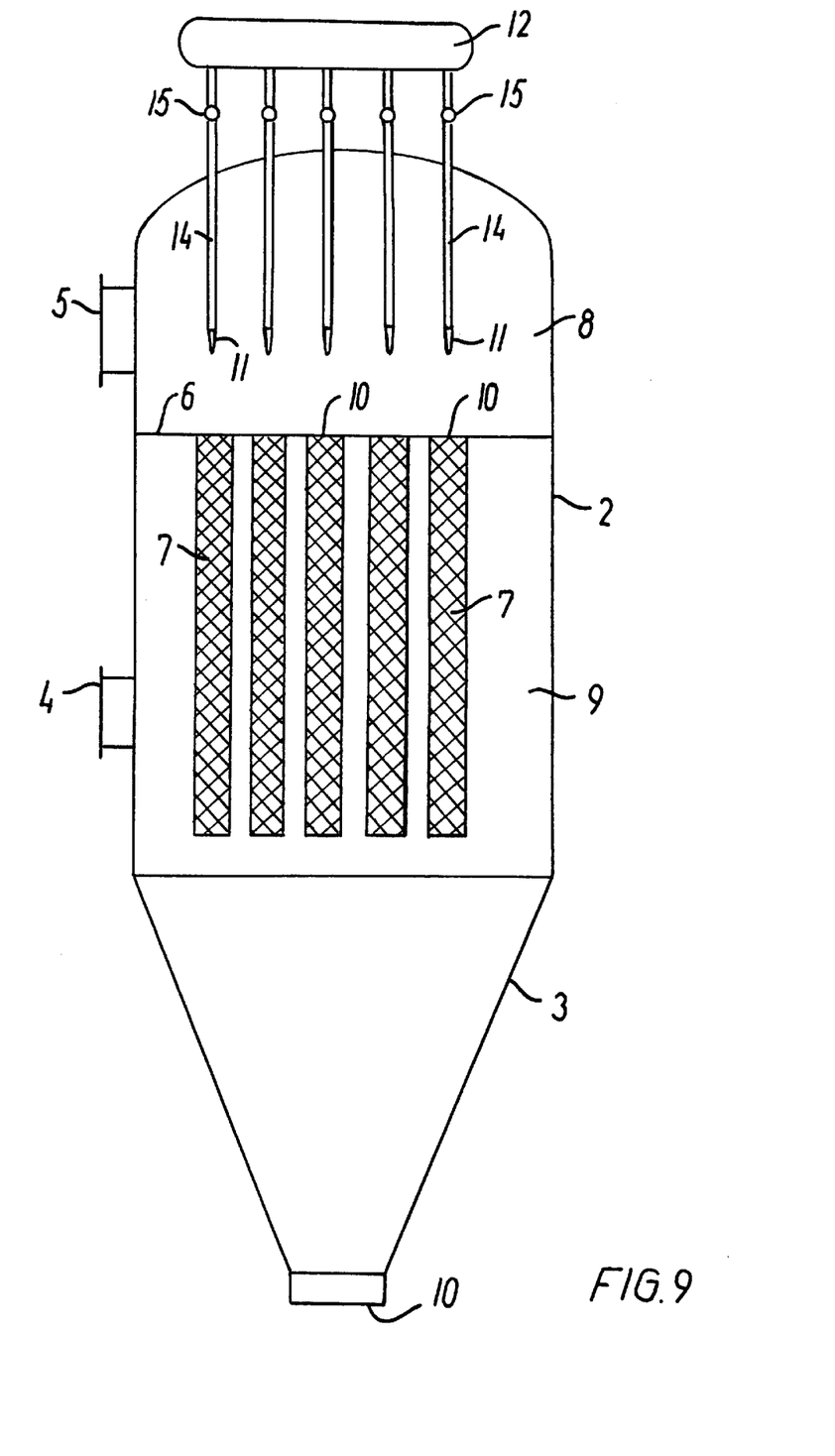
FIG. 9 illustrates a filter unit according to the invention.

An example of the general outline of a filter housing is given in FIG. 9. The housing is composed of a vertically arranged cylindrical upper section 2 connected with a downward tapered lower section 3. An inlet 4 for process gas carrying with it product to be filtered off is arranged in the lower part of the cylindrical section 2 and an outlet 5 for filtered clean gas is arranged in the upper part of section 2. At the bottom of the lower section 3, an outlet port 10 is arranged for extraction of retained product.

A horizontal plate 6 is arranged in the upper part of the cylindrical section 2 and divides the housing in an upper clean-gas chamber 8 and a lower inlet side 9. The plate 6 has a number of holes, in which elongated tubular filter elements 7 are suspended approximately vertically with upwards facing outlet openings 10 which delivers filtered gas to the clean-gas chamber 8. The filter elements 7 can e.g. be bag-shaped and are made of filter wall material that can be a substantially soft material, such as a felt, a polymer mesh or weave, supported by a basket in the interior of the bag, or the filter wall material can be a self-supporting substantially rigid porous material, such as metal fibres or ceramic fibres.

The number of filter elements in the filter unit depends on the desired filter capacity. The smallest filter has a single filter element 7. Plants for treating, handling or producing pharmaceuticals typically use smaller filter units having e.g. from 2 to 25 filter elements, and plants for foodstuffs, dairies and chemicals typically use very large filter units with many hundreds of filter elements in a single filter unit. The individual filter element can typically have a length in the range from 1 to 8 m and a diameter in the range of 8 to 30 cm, preferably about 20 cm.

During operation of the filter unit 1 process gas carrying product enters the unit through inlet 4 and flows into the area around the filter elements. The gas continues through the walls of the filter elements 7 and flows up to the upper outlet side 8 for clean filtered gas and eventually exits through the outlet 5. As the gas passes the filter walls product carried by the process gas is retained by the filter elements 7. The retained material is partially left on the filter elements and partially drops down and accumulates in the lower section 3. The accumulated product can then be extracted through the outlet port 10.

The above mentioned filter unit is a separate external unit connected to a gas outlet for particle loaded processing gas in a plant. Alternatively, the filter unit can in a well known manner be integrated into a processing unit producing the particle loaded gas, such as a spray drying apparatus or a fluid bed apparatus.

The outlet opening 10 is approximately at level with the plate 6 and faces upwards so that during filtration a flow of filtrated gas streams vertically up into clean-gas chamber 8. As the filtration proceeds some of the filtered off particles or dust accumulate on the outside of the filter element, and has to be cleaned away in order to avoid building up of dust cakes. Cleaning is effected during continuous operation of the filter unit by using high pressure reverse flow gas cleaning.

A filter cleaning nozzle 11 is positioned at a distance A above outlet opening 10. The nozzle ejects a burst of cleaning gas down into the filter element at intervals adapted to the current filtration process. The jet-like burst of reverse flowing cleaning gas produce a very quick pressure increase inside the filter element so that the filter wall accelerates outwards. The pulse of cleaning gas has a very short duration, such as from 0.10 s to 0.50 s, typically about 0.2 s, and the filter wall is therefore immediately pressed back to the filtration position by the gas pressure difference across the filter. Especially for non-rigid filter materials the result of the cleaning action is consequently of mainly mechanical nature, because the particles or dust on the filter element is shaken or kicked loose by the movement of the filter material.

A pressure vessel 12 contains pressurized primary cleaning gas at a pressure in the range of 3 to 10 barg, preferably from 4 to 6 barg. An gas supply device 13, such as a compressor, delivers compressed air or another gas at a set pressure. The setting of the pressure depends on the length of the filter element and the size of the nozzle 11. One and the same nozzle size can be used for several different lengths of filter elements by suitably varying the setting of said pressure so that a higher pressure is used for longer elements and vice versa. This setting of the pressure can be done at the commissioning of the filter. The gas supply device can also be of a type allowing adjustment of the gas pressure during operation in order to accomodate for variations in the filtration conditions. If the filter unit shows initial signs of inadequate cleaning, e.g. due to filtration of more sticky products, the pressure can be increased gradually until stable, satisfactory cleaning is re-established. And if filtration conditions changes to become less severe it is possible to gradually reduce the pressure of the primary cleaning gas to the lowest pressure providing satisfactory and stable filter cleaning, and thus save compressor work. Simultaneously with setting or adjustment of the pressure also the pulse intervals and/or the duration of each pulse can be set or adjusted.

Each individual nozzle 11 is connected to pressure vessel 12 by a feeding pipe 14 which includes a control valve 15. This valve can be mechanically activated but is preferably electronically activated and controlled by a filter control unit, such as a programmed micro-processor (not shown). It is possible to control a plurality of the nozzles by a single control valve so that groups of the filter elements are cleaned in a common operation, but each nozzle has preferably its own control valve so that the filters can be individually cleaned. The filters are cleaned in a cyclic manner one after the other. Typically one filter is cleaned every 60 s and the cyclus is planned so that the next filter element to be cleaned is remote from or at least not adjacent to the filter element just cleaned.

Figure 2:
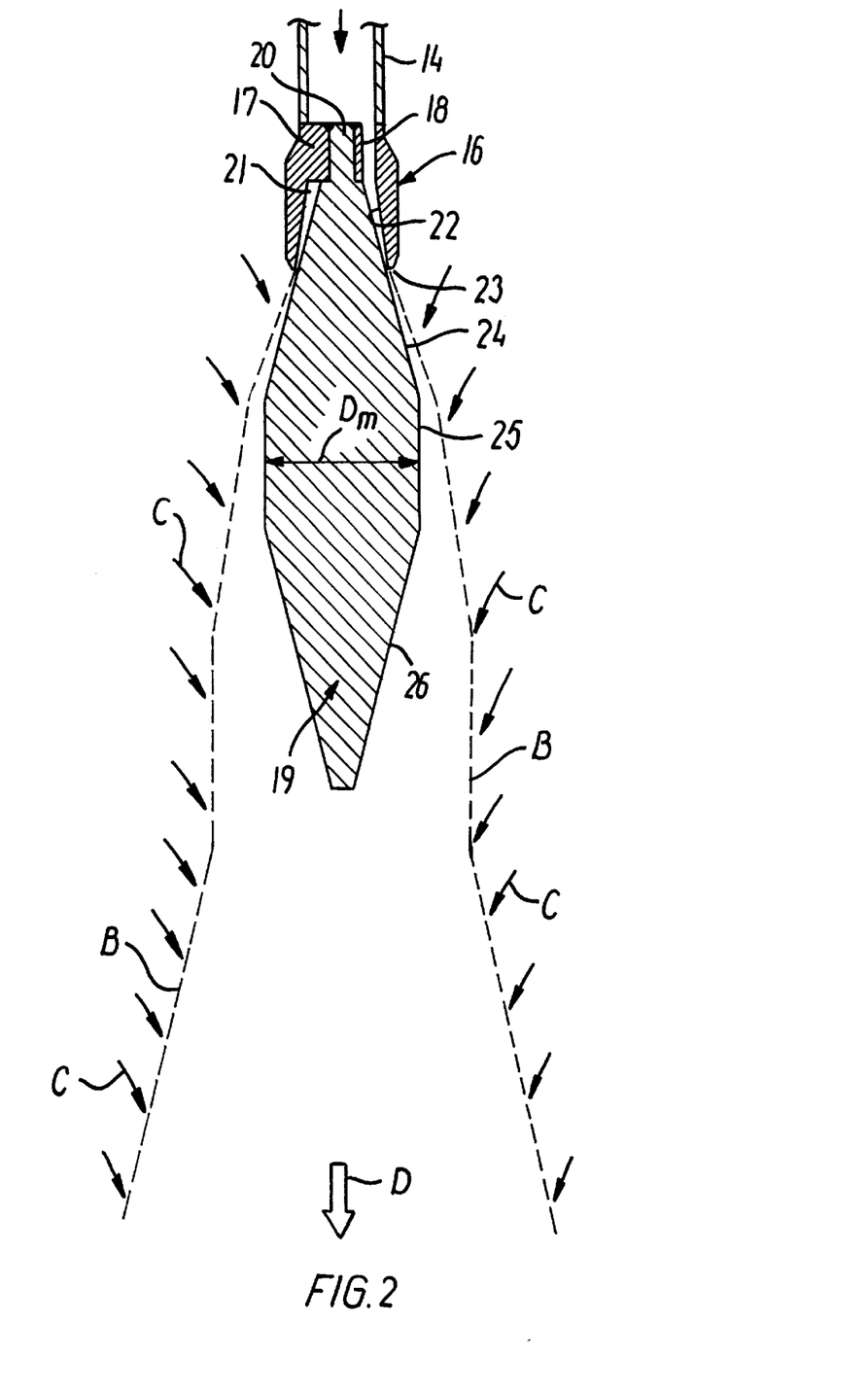
FIG. 2 shows a sectional view of an embodiment of a nozzle in the filter unit of FIG. 1, FIGS. 3–8 are sectional views of further embodiments of the nozzle.

The design and action of nozzle 11 are now described in more detail. The most preferred embodiment is depicted in FIG. 2. A housing 16 is mounted in extension of the lower end of feeding pipe 14. The housing is cup-shaped with an end wall 17 which is provided with a central bore surrounded by a circular row of through-bores 18, of which only one is visible in FIG. 2.

A guide body 19 has an upward tap 20 which has been inserted into the central bore of housing 16 and fixed in place by a weld bead at the top of the tap. An annular gas distribution chamber 21 is present between the guide body and an inner side wall 22 of housing 16. The annular chamber tapers towards a nozzle opening shaped as an annular slot 23 at the lower rim of the housing. In the present context the term slot means a slit and also a clearance or a gap of somewhat larger width than a slit. The width of the slot is chosen under consideration of the slot length and the pressure of the primary gas. At a gas pressure of about 6 barg and a slot length of about 11 cm a slot width of about 1 mm is suitable.

The guide body has a conical first portion 24 with downwards increasing diameter followed by a second portion 25 which is cylindrical and has the maximum diameter Dm of the guide body, followed by a conical end portion 26 with decreasing diameter in the downwards direction towards outlet opening 10. The three sections constitute the outer side of the guide body. This outer side is open to the gas present in clean-gas chamber 8, meaning that the outer side faces out into this gas so that the gas has direct, unrestricted access to the guide body and its immediate surroundings.

When the control valve 15 releases a burst of primary cleaning gas, the gas flows down through feeding pipe 14 and through bores 18 into the distribution chamber 21. Due to the small flow area of the annular slot the primary gas is ejected out through the annular slot at sonic speed (about 320 m/s). The guide body is positioned in front of the annular slot and diverts the gas into a flow of larger diameter. The gas flow follows the contour of the valve body, and as the flow progresses along the body more and more secondary gas is drawn into or entrained in the gas flow, causing a steadily increase in the thickness of the gas flow. In FIG. 2 the boundary between the gas flow and the more or less stationary gas in chamber 8 is indicated by the broken line B. At said boundary the stationary gas is entrained in the gas flow as secondary air, which is illustrated by arrows C. The feeding of secondary gas into the gas flow is highly efficient firstly because the guide body quickly spreads out the flow of primary gas to a large diameter, secondly because the gas flow can freely continue to build up to an even larger diameter, and thirdly because the secondary air is in direct contact with the gas flow along the whole length of the flow path in chamber 8. At the lower end portion 26 the so-called coanda-effect causes the primary gas to flow somewhat inwards along the conical outer surface of the guide body.

The amount of primary gas and its pressure and thus the kinetic energy of the cleaning gas pulse is preferably so that the cleaning gas flow is sufficiently vigorous to cause a pressure increase at the bottom of the filter element, but not a pressure increase at the top of the filter of such magnitude that the filter wall material is damaged. The distance A from the trailing end of the guide body to outlet opening 10 is selected so that the diameter of the downward gas flow D at the outlet opening largely corresponds to the diameter of the outlet opening. As above described, the cleaning action is of mainly mechanical nature and not dependant on a reverse gas flow through the filter material.

The guide body is preferably a body of revolution with a longitudinal axis extending coaxially with the longitudinal center axis of the filter element so that the gas flow is directed precisely into the filter element by the guide body. It is, however, possible to design or place the guide body asymmetrically and also obliquely with respect to the filter element. This can be an advantage when the filter element is positioned close to a barrier, such as at a corner, or in case the filter element has an asymmetrical configuration.

The nozzle can optionally be of a design that causes the primary cleaning gas to swirl about the longitudinal axis of the guide body. This can be achieved e.g. by using oblique or tilted bores 18 or by providing the chamber 21 with guide vanes or baffle plates.

In the following description of other embodiments the same reference numerals are used for details of the same kind.

Figure 3:
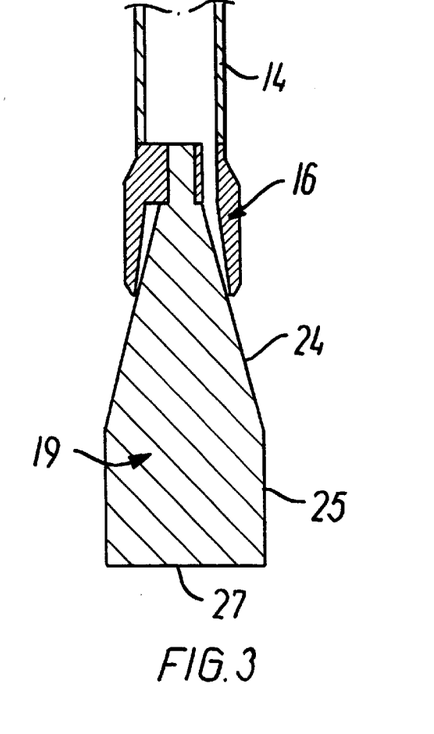

In FIG. 3 the guide body has only a first and second sections 24, 25, but no tapering end section. This results in a saving of material and thus a lowering of the production costs. The efficiency of the nozzle is somewhat lower because of a certain suction effect at the blunt end surface 27.

Figure 4:
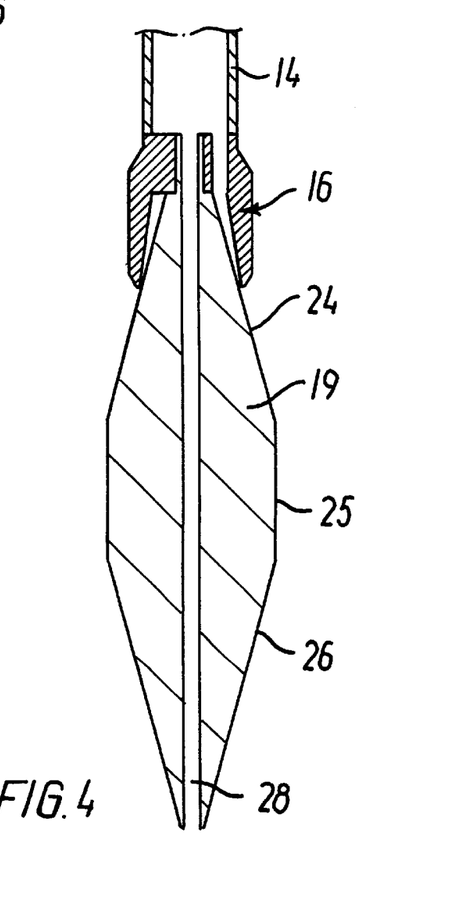

The embodiment of FIG. 4 is provided with a central, longitudinally through-going bore 28. As described above, part of the primary gas flows through the central bore and causes a deeper and more vigorous penetration at the center of the filter element.

Figures 5, 6:
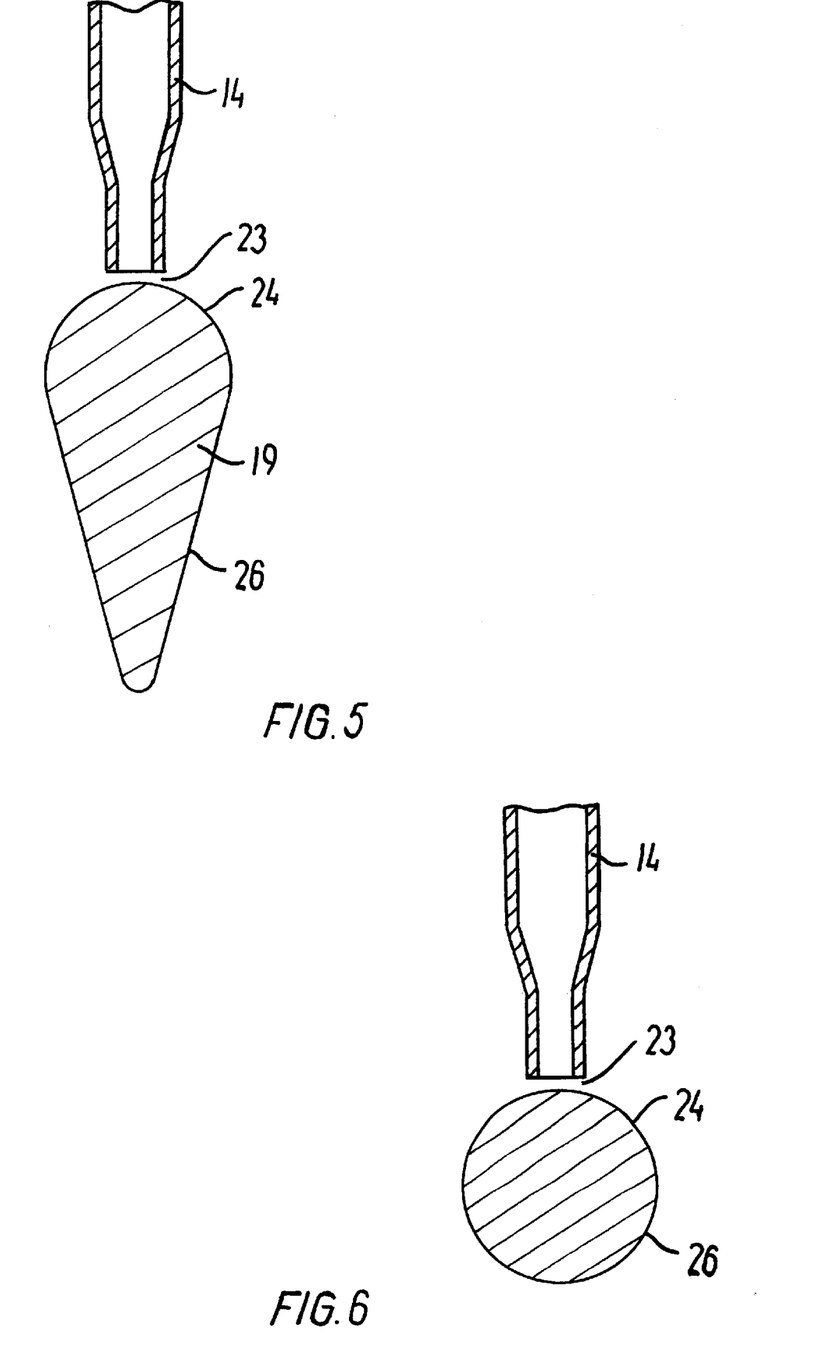

In the embodiments of FIGS. 5 and 6 the guide body 19 is located entirely in front of feeding pipe 14 and is carried by not shown rigid brackets, legs, holders or stiffeners that are fixed to both the guide body and the feeding pipe. The annular slit 23 is mainly radially outwards directed—and not mainly axially directed towards outlet opening 10 as is the case in the above mentioned embodiments. However, the coanda-effect makes the gas flow turn to a downward direction along the conical end portion 26 in FIG. 5 or the hemispherical end portion in FIG. 6.

Figures 7, 8:
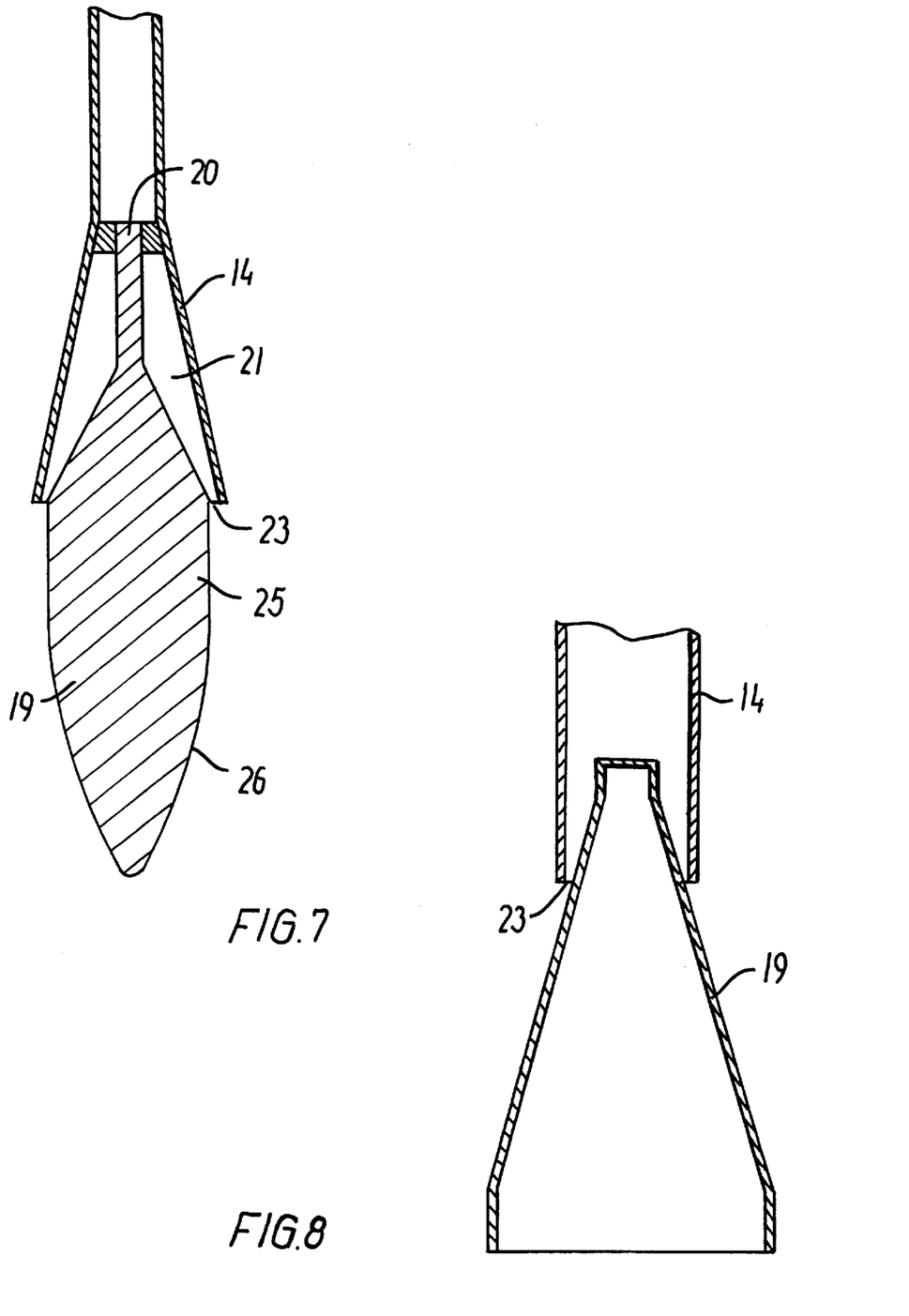

In the embodiment of FIG. 7 the feeding pipe has a conical lower portion ending at the beginning of the cylindrical second portion 25 of the guide body. The end portion 26 is gently curved towards the trailing end.

The embodiment of FIG. 8 is a lightweight construction of simple materials as the guide body is hollow and mounted to the feeding pipe 14 in the same manner as described in relation to FIGS. 5 and 6.

The guide body is preferably made of stainless steel which is an easily cleanable material well suited for sanitary installations. Other materials are also possible, e. g. polymers, ceramics or lightweight metals. The surfaces of the materials may be polished or coated.

In addition to the cleaning during operation it is desirable to be able to clean the filter unit when not in operation. This is preferably done by cleaning-in-place of the filter elements with a cleaning liquid and pulses of pressurized gas. As described in WO 98/00001 to NIRO A/S liquid and gas are mixed into common pulses on the outlet side of the filter element and supplied to the interior of the filter element.

The feeding pipe 14 for primary gas can act as a mixing chamber for liquid and gas. In FIG. 1 a liquid supply line 29 is by a branch pipe 30 connected to feeding pipe 14 downstream of the control valve 15. When cleaning liquid is admitted to line 29 a pulse of liquid flows into the feeding pipe, and immediately afterwards control valve 15 is activated to release a pulse of primary cleaning gas to the mixing chamber while the liquid is still present in pipe 14. Then the mix of liquid and gas is shot out of nozzle 11 into the filter element. The cleaning liquid can also be admitted at other locations, such as directly into the distribution chamber 21, or into the upper end of the central bore 28 which provides the advantage that the gas-liquid mixture is shot centrally into the filter element without changes in the flow direction. Another option is to modify the embodiment of FIG. 4 so that an inner pipe is mounted coaxially within pipe 14. The liquid can then be supplied to the central pipe which can also receive part of the primary gas pulse. The central pipe can in a further modification extend downwards out of pipe 14 and into the guide body, which is then fixed onto the central pipe.

FIG. 1 also illustrates liquid or gas nozzles 31 mounted in the plate 6 between the rows of filter elements 7 and mounted in the side wall of chamber 9. During the actual cleaning-in-place operation a supplement of cleaning liquid can also be supplied by these nozzles 31.

In the above mentioned embodiments the nozzle opening is designed as an annular slit or slot having a flow area which in conjunction with the pressure of the primary gas controls the gas flow rate when the nozzle is open. As an alternative the gas flow rate can be controlled by making feeding pipe 14 with a nozzle opening of such a limited flow area that this opening controls the gas flow rate, and then the guide body can be positioned at a larger distance from feeding pipe 14. In this case the nozzle opening faces towards the guide body and ejects a gas jet which hits the guide body and follows its contour in the same manner as described above.

In the above embodiments the guide body is seen to be positioned in between the nozzle opening and the outlet opening of the filter element, preferably so that the longitudinal axes of guide body and the filter element are coaxial and in line with the gas flow direction in the feeding pipe 14. It is also preferred that the guide body bars the linear direct flow path between the nozzle opening and the outlet opening 10.

Details from the various embodiments can be combined into further embodiments, and other modifications can be made. The filter elements can in a known manner be provided with venturis at or above their upper ends, and the venturis can have one or more stages, but these are not the most preferred embodiments.

What is claimed is:

1. A filter unit for filtering gas, comprising at least one filter element having an outlet opening facing a clean-gas chamber, a filter cleaning nozzle, and a source of pressurized primary cleaning gas, wherein the filter cleaning nozzle is located in the clean-gas chamber at a distance from said outlet opening and is connected to the source of pressurized primary cleaning gas via a control valve; a guide body is located in the clean-gas chamber and has an outer surface; said nozzle has a nozzle opening for injection of primary cleaning gas onto a guide surface on the outer surface of the guide body; and the guide surface is open to secondary gas in the clean-gas chamber and directs said primary cleaning gas and entrained secondary gas toward the outlet opening of the filter, and wherein the nozzle opening is an annular slot which is delimited by an annular rim of a feeding pipe for primary cleaning gas and the guide body.

2. A filter unit according to claim 1, wherein the guide body is positioned in front of the feeding pipe.

3. A filter unit according to claim 2, wherein a portion of the guide body faces towards the feeding pipe and has a central area, and said portion of the guide body is curved with its central area positioned closest to the feeding pipe.

4. A filter unit according to claim 3, wherein said portion of the guide body is hemispherical.

5. A filter unit according to claim 1, wherein on a side facing away from the outlet opening of the filter the guide body extends into a housing, and that an annular distribution chamber for primary cleaning gas in the housing ends at the nozzle opening, which is an annular slot delimited by an annular rim of the housing and the guide body.

6. A filter unit according to claim 5, wherein the annular chamber tapers towards the annular slot, and an included angle between an inner side wall of the distribution chamber and the outer side of the guide body is in the range of 2–45°.

7. A filter unit according to claim 5, wherein the guide body is carried by the housing.

8. A filter unit according to claim 7, wherein the guide body is permanently fixed to the housing.

9. A filter unit according to claim 1, wherein downstream of the nozzle opening, the guide body has a first portion with increasing diameter in direction towards the outlet opening of the filter element.

10. A filter unit according to claim 9, wherein the first portion has a conical shape.

11. A filter unit according to claim 1, wherein the guide body has an end portion with decreasing diameter in direction towards the outlet opening of the filter element.

12. A filter unit according to claim 11, wherein the end portion has a conical shape.

13. A filter unit according to claim 9, wherein the guide body has an end portion with decreasing diameter in the direction toward the outlet opening of the filler element, and in between the first portion and the end portion the guide body has a second portion with mainly constant diameter.

14. A filter unit according to claim 13, wherein the end portion has a conical shape.

15. A filter unit according to claim 1, wherein the guide body has a trailing end and a longitudinal, through-going bore for feeding a part of the primary cleaning gas to the trailing end.

16. A filter unit according to claim 1, wherein the unit comprises a plurality of filter elements, each having an associated filter cleaning nozzle which is connected to the source of pressurized primary cleaning gas via a feeding pipe that extends out of the clean-gas chamber to the control valve.

17. A filter unit according to claim 16, wherein the feeding pipes are mainly vertical.

18. A filter unit according to claim 16, wherein the individual feeding pipe is connected via a valve to a source of cleaning liquid.

19. A filter unit according to claim 1, wherein the filter element material next to the outlet opening is freely open to cleaning air from the nozzle.

20. A filter unit according to claim 1, wherein the pressure in the source of primary cleaning gas is settable.

21. A filter unit according to claim 1, wherein the pressure in the source of primary cleaning gas is adjustable.

22. A filter unit for filtering gas, comprising at least one filter element having an outlet opening, a filter cleaning nozzle in a clean-gas chamber, and a source of pressurized primary cleaning gas, wherein the filter cleaning nozzle with a guide body is located at a distance from said outlet opening and is connected to the source of pressurized primary cleaning gas via a control valve; the guide body has an outer surface; said nozzle has a nozzle opening for ejection of primary cleaning gas along the outer surface of the guide body; said outer surface has a first portion with increasing diameter in the direction of the outlet opening of the filter element and said guide body has an end portion with decreasing diameter in the direction of the outlet opening of the filter element and in between the first portion and the end portion said guide body has a second portion with mainly constant diameter.

23. A filter unit according to claim 22, wherein the end portion has a conical shape.

24. A filter unit for filtering gas, comprising at least one filter element having an outlet opening, a filter cleaning nozzle in a clean-gas chamber, and a source of pressurized primary cleaning gas, wherein the filter cleaning nozzle with a guide body is located at a distance from said outlet opening; the guide body has an outer surface; said nozzle has a nozzle opening for ejection of primary cleaning gas along the outer surface of the guide body; said guide body has a conical end portion with decreasing diameter in the direction of the outlet opening of the filter element; and the guide body has a trailing end and a longitudinal, through-going bore, for feeding a part of the primary cleaning gas to the trailing end.

* * * * *